United States Patent
Tsutsumi

(10) Patent No.: US 12,142,067 B2
(45) Date of Patent: Nov. 12, 2024

(54) LEARNING DATASET GENERATION SYSTEM, LEARNING DATASET GENERATION SERVER, AND COMPUTER READABLE NON-TEMPORARY RECORDING MEDIUM STORING LEARNING DATASET GENERATION PROGRAM

(71) Applicant: KYOCERA Document Solutions Inc., Osaka (JP)

(72) Inventor: Masafumi Tsutsumi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 939 days.

(21) Appl. No.: 17/179,461

(22) Filed: Feb. 19, 2021

(65) Prior Publication Data
US 2021/0256252 A1    Aug. 19, 2021

(30) Foreign Application Priority Data
Feb. 19, 2020 (JP) .................... 2020-026223

(51) Int. Cl.
| | |
|---|---|
| *G06N 20/00* | (2019.01) |
| *G06F 18/211* | (2023.01) |
| *G06F 18/214* | (2023.01) |
| *G06F 18/23* | (2023.01) |
| *G06F 18/241* | (2023.01) |
| *G06V 10/22* | (2022.01) |
| *G06V 10/762* | (2022.01) |
| *G06V 10/98* | (2022.01) |
| *G06V 30/40* | (2022.01) |

(Continued)

(52) U.S. Cl.
CPC ............ *G06V 30/40* (2022.01); *G06F 18/211* (2023.01); *G06F 18/214* (2023.01); *G06F 18/23* (2023.01); *G06F 18/241* (2023.01); *G06N 20/00* (2019.01); *G06V 10/235* (2022.01); *G06V 10/762* (2022.01); *G06V 10/987* (2022.01); *G06V 30/413* (2022.01); *G06V 10/95* (2022.01)

(58) Field of Classification Search
CPC .... G06V 30/40; G06V 10/235; G06V 10/762; G06V 10/987; G06V 30/413; G06V 10/95; G06F 18/211; G06F 18/214; G06F 18/23; G06F 18/241; G06N 20/00
See application file for complete search history.

(56) References Cited

U.S. PATENT DOCUMENTS

| | | | |
|---|---|---|---|
| 7,308,451 B1 * | 12/2007 | Lamping | G06F 16/35 707/999.005 |
| 11,120,364 B1 * | 9/2021 | Gokalp | G06N 20/00 |

FOREIGN PATENT DOCUMENTS

JP    2016-071412    5/2016

* cited by examiner

*Primary Examiner* — Hope C Sheffield
(74) *Attorney, Agent, or Firm* — LEX IP MEISTER, PLLC

(57) ABSTRACT

A learning dataset generation system: divides a plurality of labeled images into a plurality of clusters by performing clustering on the basis of a feature amount of the labeled images; selects training data for each of the clusters; generates a labeled image classification inference model by learning the training data of all of the clusters; obtains a degree of certainty by performing inference of a labeled image using the labeled image classification inference model, confirms a form in which the degree of certainty with respect to the labeled image is greater than or equal to a specified value as the form of the labeled image, and (Continued)

provides a UI that causes labeled images having the same form as each other to be assigned the same label.

5 Claims, 16 Drawing Sheets

(51) Int. Cl.
    *G06V 30/413*     (2022.01)
    *G06V 10/94*     (2022.01)

FIG. 7

| LABEL | FORM |
|---|---|
| Docment_type_00 | Form_00_00 |
| | Form_00_01 |
| | Form_00_02 |
| | ⋮ |
| | Form_00_09 |
| Docment_type_01 | Form_01_00 |
| | Form_01_01 |
| | Form_01_02 |
| | ⋮ |
| | Form_01_09 |
| ⋮ | ⋮ |
| Docment_type_29 | Form_29_00 |
| | Form_29_01 |
| | Form_29_02 |
| | ⋮ |
| | Form_29_09 |

LEARNING DATASET GENERATION SYSTEM, LEARNING DATASET GENERATION SERVER, AND COMPUTER READABLE NON-TEMPORARY RECORDING MEDIUM STORING LEARNING DATASET GENERATION PROGRAM

INCORPORATION BY REFERENCE

This application is based upon, and claims the benefit of priority from, corresponding Japanese Patent Application No. 2020-026223 filed in the Japan Patent Office on Feb. 19, 2020, the entire contents of which are incorporated herein by reference.

BACKGROUND

Field of the Invention

The present disclosure relates to a learning dataset generation system, a learning dataset generation server, and a computer-readable non-temporary recording medium storing a learning dataset generation program that generate a learning dataset of an inference model for classifying a document (hereinafter referred to as "learning dataset").

Description of Related Art

Conventionally, there is known a technique that classifies a document by executing a clustering process that uses a feature amount of an image of the document (hereinafter referred to as "document image").

SUMMARY

A learning dataset generation system of the present disclosure generates a learning dataset of a document classification inference model that serves as an inference model for classifying and assigning a label to a document image, which is an image of a document, wherein the learning dataset includes a plurality of document images that have been assigned a label; the learning dataset generation system divides the plurality of document images into a plurality of clusters by performing clustering on the basis of a feature amount of the document images, selects training data for each of the clusters from among the document images belonging to the cluster, and generates, by learning the training data of all of the clusters, an image classification inference model that serves as an inference model for classifying document images by form; the learning dataset generation system performs inference of the document image using the image classification inference model to obtain a degree of certainty, and confirms a form in which the degree of certainty with respect to the document image is greater than or equal to a specified value as the form of the document image; and the learning dataset generation system provides a UI that causes the document images having the same form as each other to be assigned the same label.

A learning dataset generation server of the present disclosure generates a learning dataset of a document classification inference model that serves as an inference model for classifying and assigning a label to a document image, which is an image of a document, wherein the learning dataset includes a plurality of document images that have been assigned a label; the learning dataset generation server divides the plurality of document images into a plurality of clusters by performing clustering on the basis of a feature amount of the document images, selects training data for each of the clusters from among the document images belonging to the cluster, and generates, by learning the training data of all of the clusters, an image classification inference model that serves as an inference model for classifying document images by form; the learning dataset generation server performs inference of the document image using the image classification inference model to obtain a degree of certainty, and confirms a form in which the degree of certainty with respect to the document image is greater than or equal to a specified value as the form of the document image; and the learning dataset generation server provides a UI that causes the document images having the same form as each other to be assigned the same label.

A computer-readable non-temporary recording medium of the present disclosure stores a learning dataset generation program, the learning dataset generation program being a program for generating a learning dataset of a document classification inference model that serves as an inference model for classifying and assigning a label to a document image, which is an image of a document, wherein the learning dataset includes a plurality of document images that have been assigned a label; a computer, as a result of executing the learning dataset generation program, divides the plurality of document images into a plurality of clusters by performing clustering on the basis of a feature amount of the document images, selects training data for each of the clusters from among the document images belonging to the cluster, and generates, by learning the training data of all of the clusters, an image classification inference model that serves as an inference model for classifying document images by form; the computer, as a result of executing the learning dataset generation program, performs inference of the document image using the image classification inference model to obtain a degree of certainty, and confirms a form in which the degree of certainty with respect to the document image is greater than or equal to a specified value as the form of the document image; and the computer, as a result of executing the learning dataset generation program, provides a UI that causes the document images having the same form as each other to be assigned the same label.

BRIEF DESCRIPTION OF THE DRAWINGS

FIG. 7 is a diagram showing an example of a label form list used when a dataset creator designates a label to be assigned to an unlabeled image displayed on a display unit in the operation shown in FIG. 5;

DETAILED DESCRIPTION

Hereinafter, embodiments of the present disclosure will be described using the drawings.

First Embodiment

First, the configuration of a document classification system serving as a learning dataset generation system according to a first embodiment of the present disclosure will be described.

Figure 1:
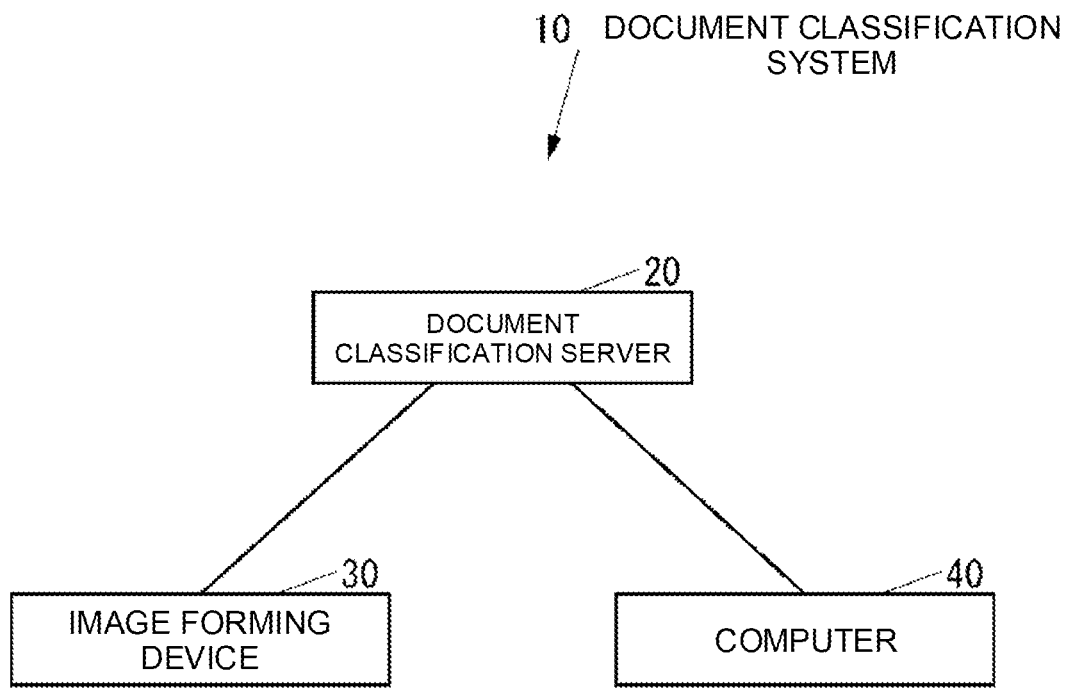
FIG. 1 is a block diagram of a document classification system according to a first embodiment of the present disclosure.

FIG. 1 is a block diagram of a document classification system 10 according to the present embodiment.

As shown in FIG. 1, the document classification system 10 includes a document classification server 20 that classifies a document, an image forming device 30 that reads an image from a document to be subjected to classification, and a computer 40 such as a PC (Personal Computer).

The document classification server 20 may be configured by a single computer, or may be configured by a plurality of computers.

The document classification server 20 and the image forming device 30 are capable of communication via a network such as a LAN (Local Area Network) or the Internet, or directly communicating in wired or wireless fashion without going through a network. Similarly, the document classification server 20 and the computer 40 are capable of communication via a network such as a LAN or the Internet, or directly communicating in wired or wireless fashion without going through a network.

Figure 2:
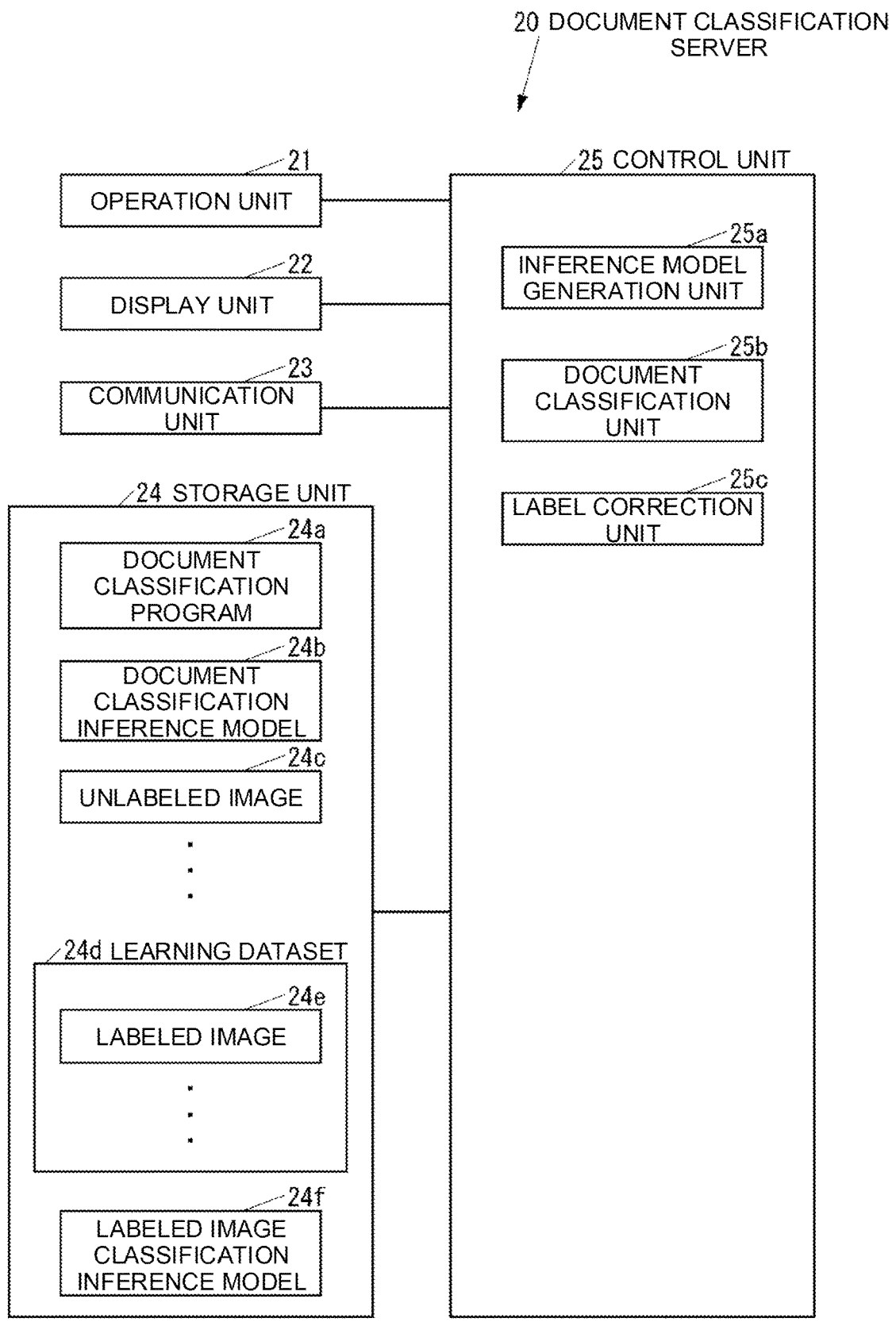
FIG. 2 is a block diagram of the document classification server shown in FIG. 1 when the document classification server is configured by a single computer.

FIG. 2 is a block diagram of the document classification server 20 when the document classification server 20 is configured by a single computer.

As shown in FIG. 2, the document classification server 20 includes: an operation unit 21, which is an operation device such a keyboard or a mouse with respect to which various operations are input; a display unit 22, which is a display device such as an LCD (Liquid Crystal Display) that displays various information; a communication unit 23, which is a communication device that communicates with an external device via a network such as a LAN or the Internet, or directly communicates in a wired or wireless fashion without going through a network; a storage unit 24, which is a non-volatile storage device such as a semiconductor memory or an HDD (Hard Disk Drive) that stores various information; and a control unit 25 that controls the document classification server 20 as a whole.

The storage unit 24 stores a document classification program 24a for classifying a document. For example, the document classification program 24a may be installed on the document classification server 20 at the manufacturing stage of the document classification server 20, may be additionally installed on the document classification server 20 from an external storage medium such as a USB (Universal Serial Bus) memory, or may be additionally installed on the document classification server 20 from a network.

The storage unit 24 is capable of storing a document classification inference model 24b serving as an inference model for classifying a document.

The storage unit 24 is capable of storing document images (hereinafter referred to as "unlabeled images") 24c not having an assigned label. The storage unit 24 is capable of storing at least one unlabeled image in addition to the unlabeled images 24c.

The storage unit 24 is capable of storing a learning dataset 24d of the document classification inference model. The learning dataset 24d is capable of including document images (hereinafter referred to as "labeled images") 24e having an assigned label. The learning dataset 24d is capable of including at least one labeled image in addition to the labeled images 24e.

The storage unit 24 is capable of storing a labeled image classification inference model 24f which serves as an image classification inference model, which is an inference model for classifying labeled images by form.

The control unit 25 includes, for example, a CPU (Central Processing Unit), a ROM (Read Only Memory) that stores programs and various data, and a RAM (Random Access Memory) serving as the memory used as a work area of the CPU of the control unit 25. The CPU of the control unit 25 executes programs stored in the storage unit 24 or the ROM of the control unit 25.

As a result of executing the document classification program 24a, the control unit 25 realizes: an inference model generation unit 25a that generates the document classification inference model 24b; a document classification unit 25b that classifies a document by using the document classification inference model 24b; and a label correction unit 25c that corrects a label that has been assigned to a labeled image. The label correction unit 25c corrects the learning dataset 24d. Therefore, the document classification program 24a constitutes the learning dataset generation program of the present disclosure. Further, the document classification server 20 constitutes the learning dataset generation server of the present disclosure.

Figure 3:
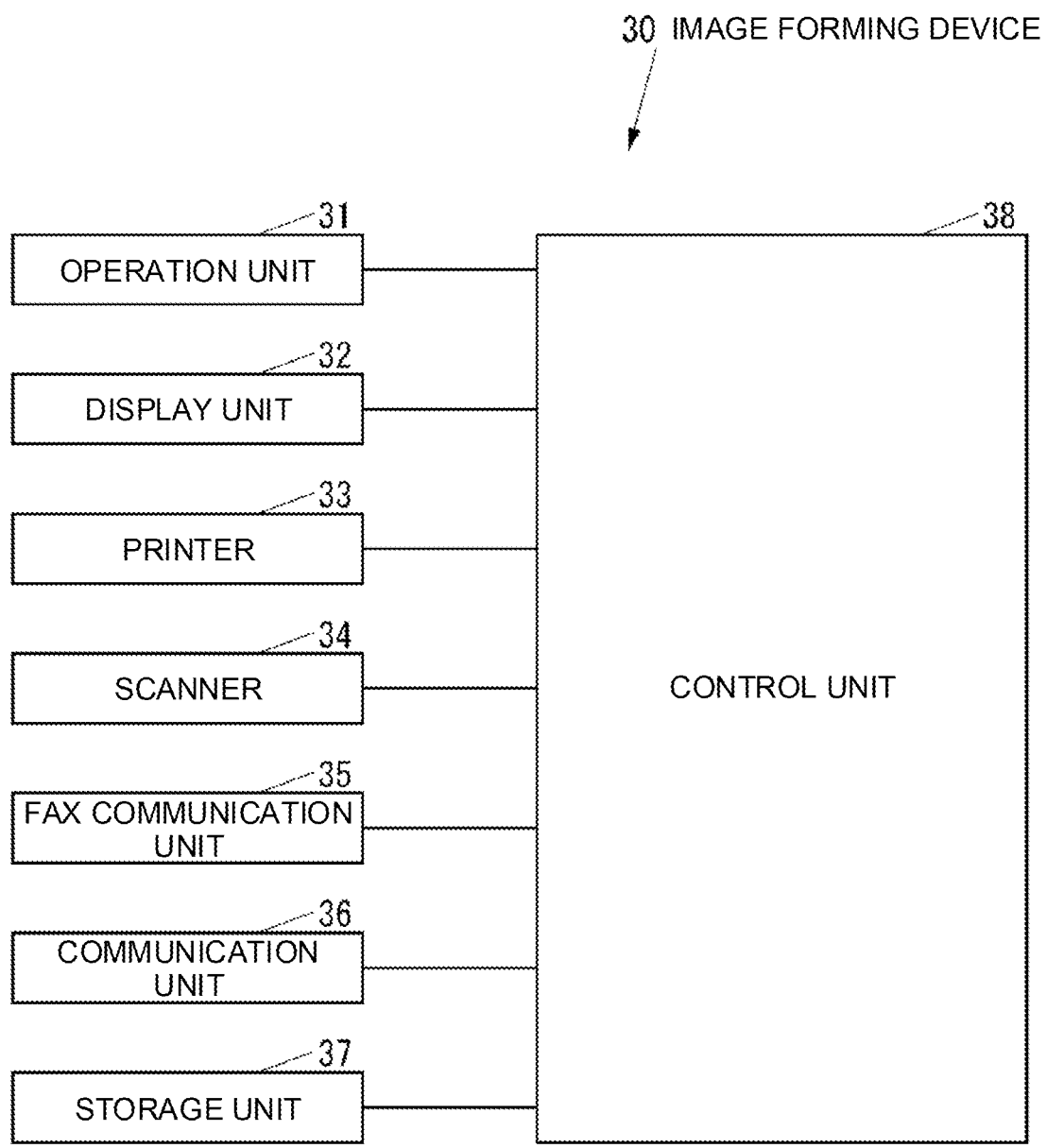
FIG. 3 is a block diagram of the image forming device shown in FIG. 1 when the image forming device is an MFP.

FIG. 3 is a block diagram of the image forming device 30 when the image forming device 30 is an MFP.

The image forming device 30 shown in FIG. 3 includes: an operation unit 31, which is an operation device such as buttons with respect to which various operations are input; a display unit 32, which is a display device such as an LCD that displays various information; a printer 33, which is a printing device that prints images on a recording medium such as paper; a scanner 34, which is a reading device that reads images from a document; a fax communication unit 35, which is a fax device that performs fax communication with an external facsimile device (not shown) via a communication line such as a public telephone line; a communication unit 36, which is a communication device that communicates with an external device via a network such as a LAN or the Internet, or directly communicates with an external device in a wired or wireless fashion without going through a network; a storage unit 37, which is a non-volatile storage device such as a semiconductor memory or an HDD that stores various information; and a control unit 38 that controls the image forming device 30 as a whole.

The control unit 38 includes, for example, a CPU, a ROM that stores programs and various data, and a RAM serving as the memory used as a work area of the CPU of the control unit 38. The CPU of the control unit 38 executes programs stored in the storage unit 37 or the ROM of the control unit 38.

Figure 4:
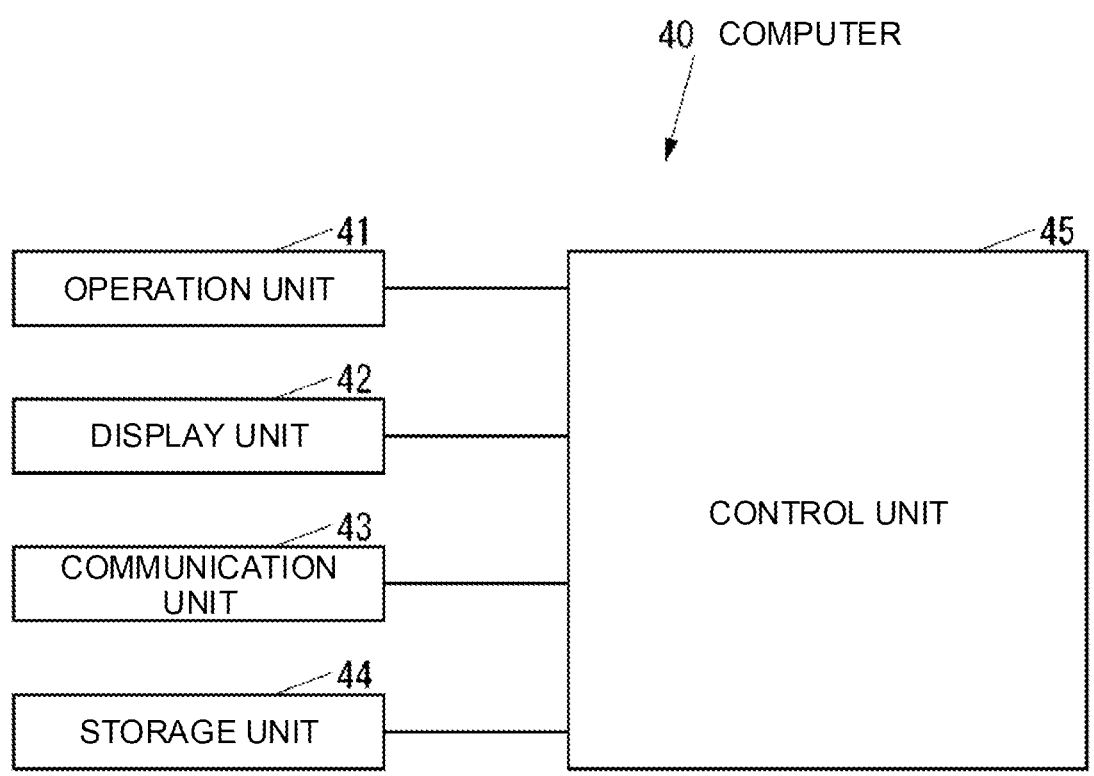
FIG. 4 is a block diagram of the computer shown in FIG. 1.

FIG. 4 is a block diagram of the computer 40.

The computer 40 shown in FIG. 4 includes: an operation unit 41, which is an operation device such a keyboard or a mouse with respect to which various operations are input; a display unit 42, which is a display device such as an LCD that displays various information; a communication unit 43, which is a communication device that communicates with an external device via a network such as a LAN or the Internet, or directly communicates with an external device in a wired or wireless fashion without going through a network; a storage unit 44, which is a non-volatile storage device such as a semiconductor memory or an HDD that stores various information; and a control unit 45 that controls the computer 40 as a whole.

The control unit 45 includes, for example, a CPU, a ROM that stores programs and various data, and a RAM serving as the memory used as a work area of the CPU of the control unit 45. The CPU of the control unit 45 executes programs stored in the storage unit 44 or the ROM of the control unit 45.

Next, the operation performed by the document classification system 10 will be described.

First, the operation performed by the document classification system 10 when document images are accumulated in the document classification server 20 and the document classification inference model 24b does not exist will be described.

Figure 5:
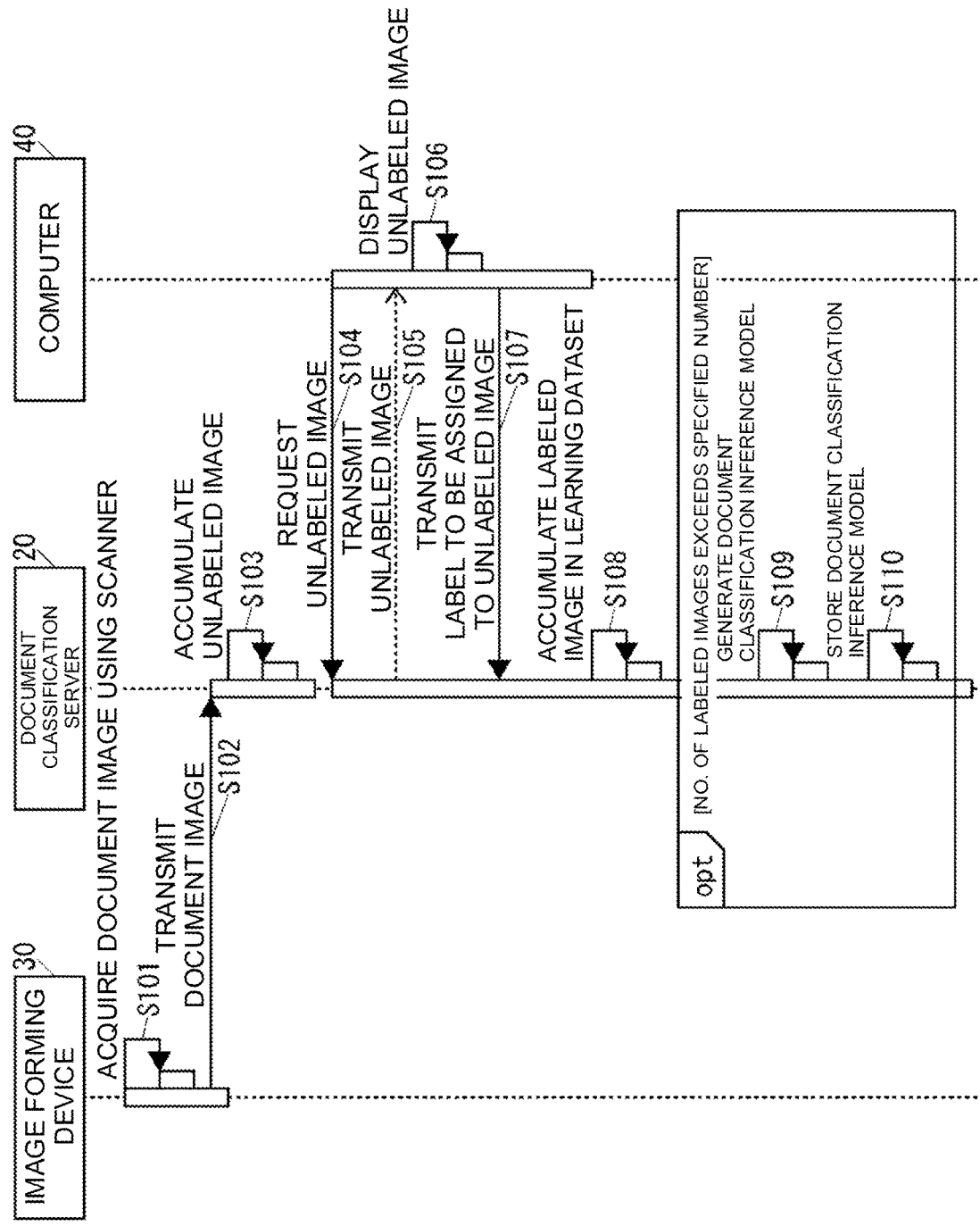
FIG. 5 is a sequence diagram showing the operation performed by the document classification system shown in FIG. 1 when document images are accumulated in the document classification server and a document classification inference model does not exist.

FIG. 5 is a sequence diagram showing the operation performed by the document classification system 10 when document images are accumulated in the document classification server 20 and the document classification inference model 24b does not exist.

After a document to be subjected to classification has been set on the scanner 34 of the image forming device 30, a user such as the creator of the learning dataset 24d (hereinafter referred to as "dataset creator") is capable of instructing the document classification server 20 to accumulate a document image via the operation unit 31 of the image forming device 30.

As shown in FIG. 5, when the document classification server 20 is instructed to accumulate a document image, the control unit 38 of the image forming device 30 acquires, by means of the scanner 34, a document image from the document to be subjected to classification that has been set on the scanner 34 (S101). Then, the document image acquired in S101 is transmitted to the document classification server 20 (S102).

When the inference model generation unit 25a of the document classification server 20 receives the document image transmitted by the image forming device 30 in S102, it accumulates the received document image as an unlabeled image in the storage unit 24 (S103).

After the unlabeled image is accumulated in the document classification server 20, the dataset creator is capable of instructing the start of processing which generates a learning dataset via the operation unit 41 of the computer 40.

When the start of the processing which generates a learning dataset is instructed, the control unit 45 of the computer 40 requests from the document classification server 20 the unlabeled images accumulated in the document classification server 20 (S104).

When the inference model generation unit 25a of the document classification server 20 receives the request made in S104, it transmits the unlabeled images accumulated in the document classification server 20 to the computer 40 (S105).

When the control unit 45 of the computer 40 receives the unlabeled images transmitted from the document classification server 20 in S105, it displays the received unlabeled images on the display unit 42 (S106). Therefore, for each unlabeled image, the dataset creator is capable of designating to the computer 40, via the operation unit 41, the labels to be assigned to the unlabeled images displayed on the display unit 42.

When the labels for the unlabeled images are designated, the control unit 45 transmits to the document classification server 20 the label of each unlabeled image to be assigned to the unlabeled images (S107).

When the inference model generation unit 25a of the document classification server 20 receives the label of each unlabeled image transmitted from the computer 40 in S107, it accumulates document images in which the received labels are assigned to the unlabeled images associated with these labels as labeled images in the learning dataset 24d (S108).

If the number of labeled images included in the learning dataset 24d exceeds a specified number, the inference model generation unit 25a uses AI (Artificial Intelligence) learning to generate the document classification inference model 24b by learning all of the labeled images included in the learning dataset 24d (S109), and stores the document classification inference model 24b generated in S109 in the storage unit 24 (S110).

Next, the operation performed by the document classification system 10 when document images are accumulated in the document classification server 20 and the document classification inference model 24b exists will be described.

Figure 6:
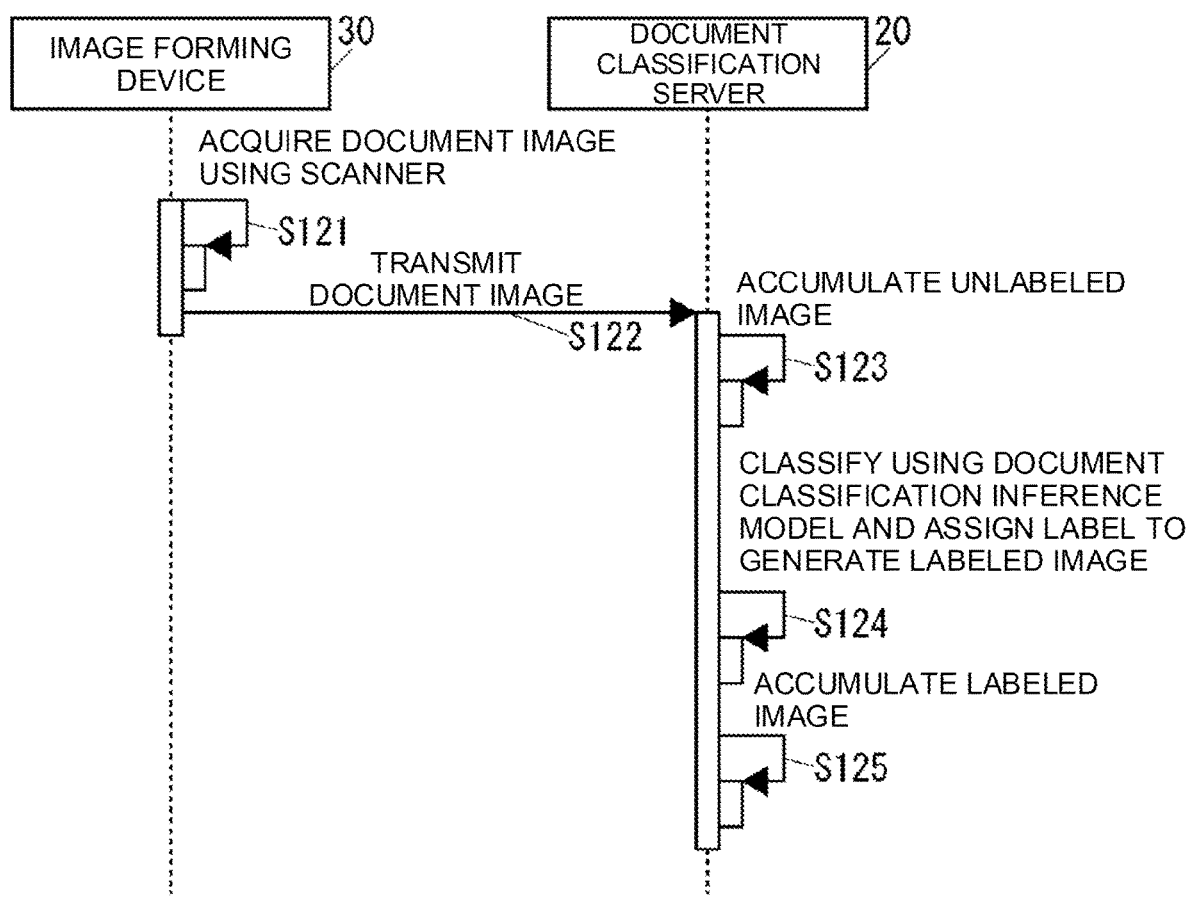
FIG. 6 is a sequence diagram showing the operation performed by the document classification system shown in FIG. 1 when document images are accumulated in the document classification server and a document classification inference model exists.

FIG. 6 is a sequence diagram showing the operation performed by the document classification system 10 when document images are accumulated in the document classification server 20 and the document classification inference model 24b exists.

After a document to be subjected to classification has been set on the scanner 34 of the image forming device 30, the user is capable of instructing the document classification server 20 to accumulate a document image via the operation unit 31 of the image forming device 30.

As shown in FIG. 6, when the document classification server 20 is instructed to accumulate a document image, the control unit 38 of the image forming device 30 acquires, by means of the scanner 34, a document image from the document to be subjected to classification that has been set on the scanner 34 (S121). Then, the document image acquired in S121 is transmitted to the document classification server 20 (S122).

When the document classification unit 25b of the document classification server 20 receives the document image transmitted by the image forming device 30 in S122, it accumulates the received document image as an unlabeled image in the storage unit 24 (S123).

Next, the document classification unit 25*b* generates a labeled image by assigning a label to the unlabeled image accumulated in the storage unit 24 in S123 by classifying the image using the document classification inference model 24*b* stored in the storage unit 24 (S124), and accumulates the labeled image generated in S124 in the storage unit 24 (S125).

Next, the method by which the dataset creator designates a label to be assigned to an unlabeled image displayed on the display unit 42 in S106 will be described.

The dataset creator has a list of document labels and forms (hereinafter referred to as "label form list").

FIG. 7 is a diagram showing an example of a label form list.

The label form list shown in FIG. 7 contains 30 types of labels as document labels, from "Docment_type_00" to "Docment_type_29". Further, 10 types of forms having different appearances to each other are associated with each label. For example, the 10 types of forms from "Form_00_00" to "Form_00_09" are associated with the label "Docment_type_00". Therefore, 300 types of forms having different appearances to each other are included in the label form list.

Figure 8:
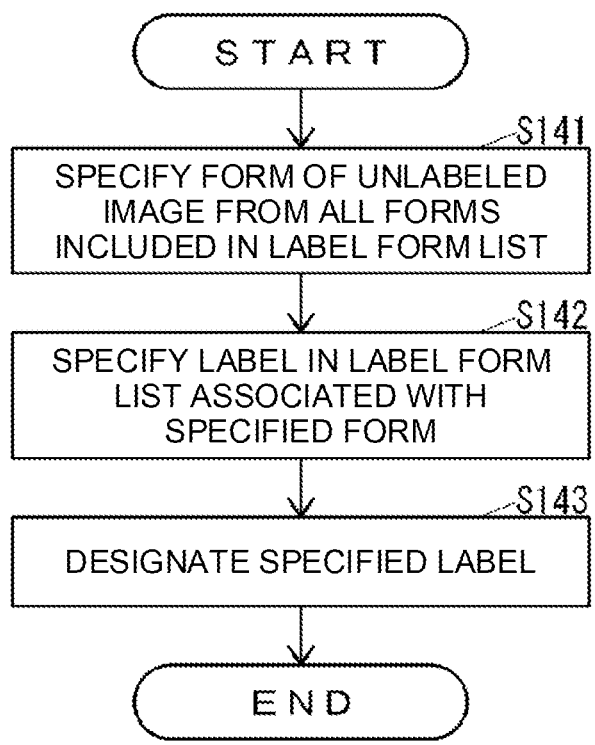
FIG. 8 is a flowchart showing a method by which a dataset creator designates a label to be assigned to an unlabeled image displayed on a display unit in the operation shown in FIG. 5.

FIG. 8 is a flowchart showing a method by which the dataset creator designates a label to be assigned to an unlabeled image.

If a label to be assigned to the unlabeled image displayed on the display unit 42 in S106 is to be designated, as shown in FIG. 8, the dataset creator specifies the form of the unlabeled image from all of the forms included in the label form list (S141). For example, if the label form list is as shown in FIG. 7, the dataset creator determines whether or not the form of the unlabeled image is one of the 300 types of forms included in the label form list.

After the processing of S141, the dataset creator specifies the label in the label form list which is associated with the form specified in S141 as the label to be assigned to the unlabeled image (S142).

Then, the dataset creator designates to the computer 40, via the operation unit 41, that the label specified in S142 as the label to be assigned to the unlabeled image is the label to be assigned to the unlabeled image (S143).

Here, if forms associated with different labels are similar to each other, there is a possibility that the dataset creator may mistakenly assign an inappropriate label to the unlabeled image.

Furthermore, because the dataset creator needs to execute the operations of specifying an appropriate form to the target unlabeled image from 300 types of forms (S141), and assigning a label associated with the form specified in S141 to the target unlabeled image (S142 and S143) for a large number of document images included in the learning dataset, there is a possibility that inappropriate labels may be assigned to the unlabeled images due to loss of concentration from fatigue caused by long periods of work.

Next, the operation performed by the document classification system 10 when processing that corrects a label assigned to a labeled image (hereinafter referred to as "label correction processing") is executed will be described.

The dataset creator is capable of instructing the start of label correction processing via the operation unit 41 of the computer 40 before the processing that generates the document classification inference model 24*b* in S109 is started. The inference model generation unit 25*a* of the document classification server 20 uses the learning dataset 24*d* after execution of label correction processing when executing the processing that generates the document classification inference model 24*b* in S109.

When the start of label correction processing is instructed, the control unit 45 of the computer 40 instructs the document classification server 20 to start the label correction processing.

Figure 9:
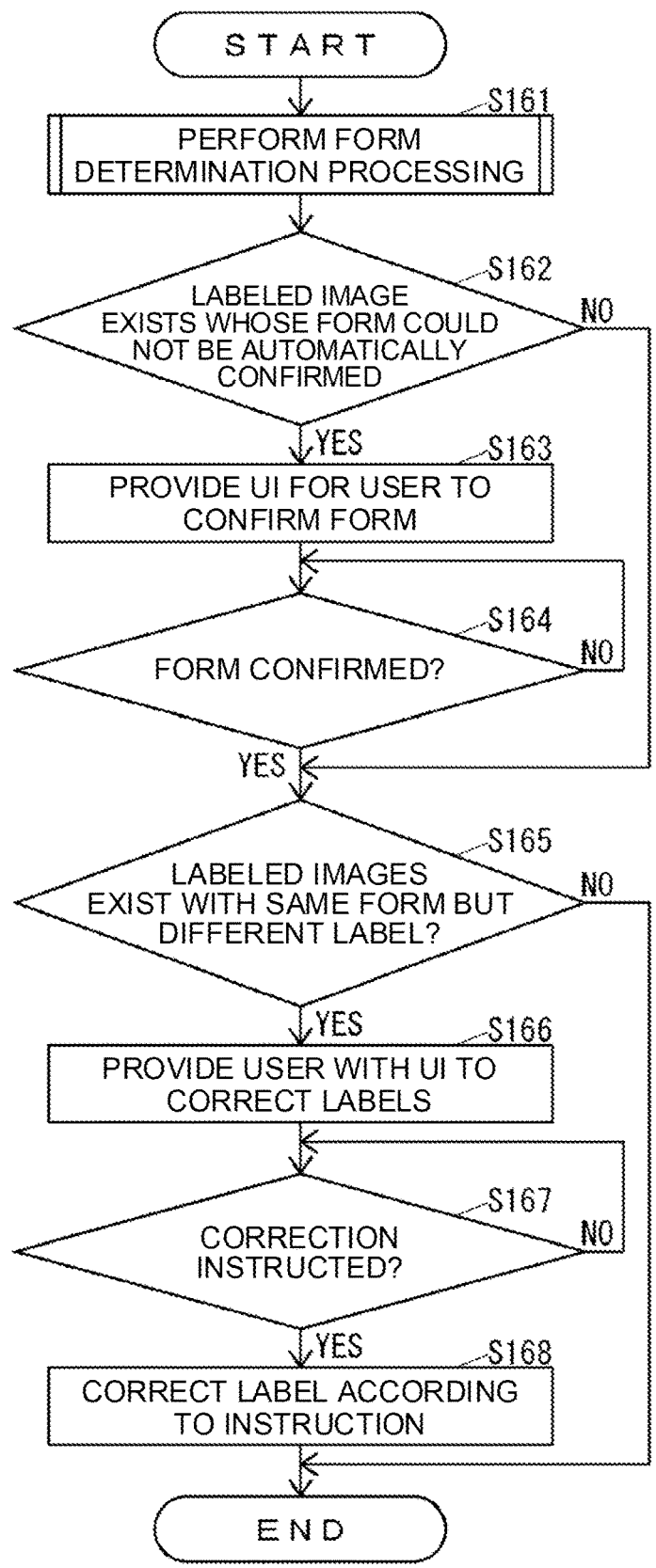
FIG. 9 is a flowchart performed by the document classification server shown in FIG. 2 when label correction processing is executed.

FIG. 9 is a flowchart performed by the document classification server 20 when label correction processing is executed.

The label correction unit 25*c* of the document classification server 20 executes the operation shown in FIG. 9 when the start of label correction processing is instructed.

As shown in FIG. 9, the label correction unit 25*c* executes form determination processing, which determines the forms of the labeled images included in the learning dataset 24*d* (S161).

Figure 10:
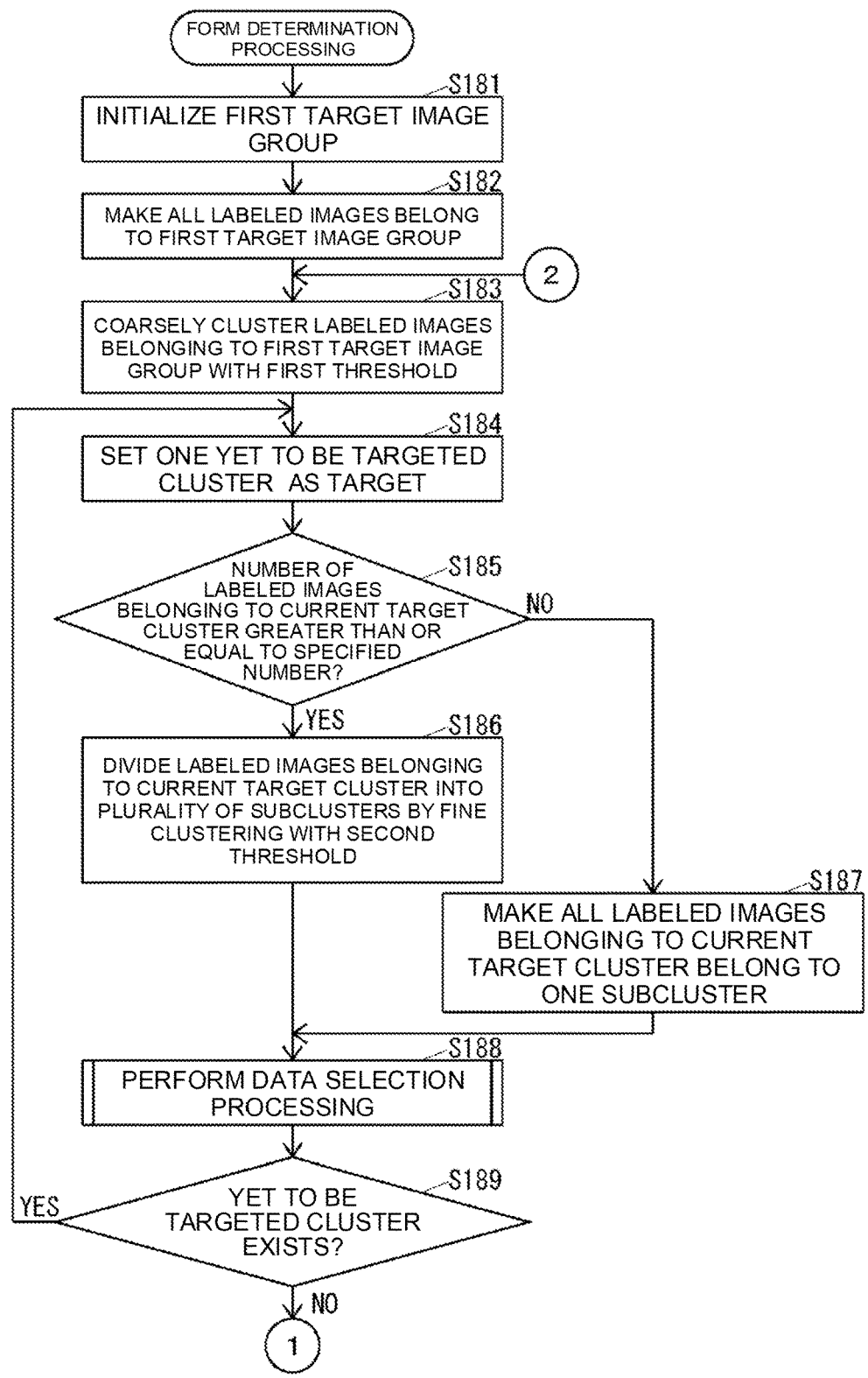
FIG. 10 is a flowchart showing a portion of the form determination processing shown in FIG. 9.
Figure 11:
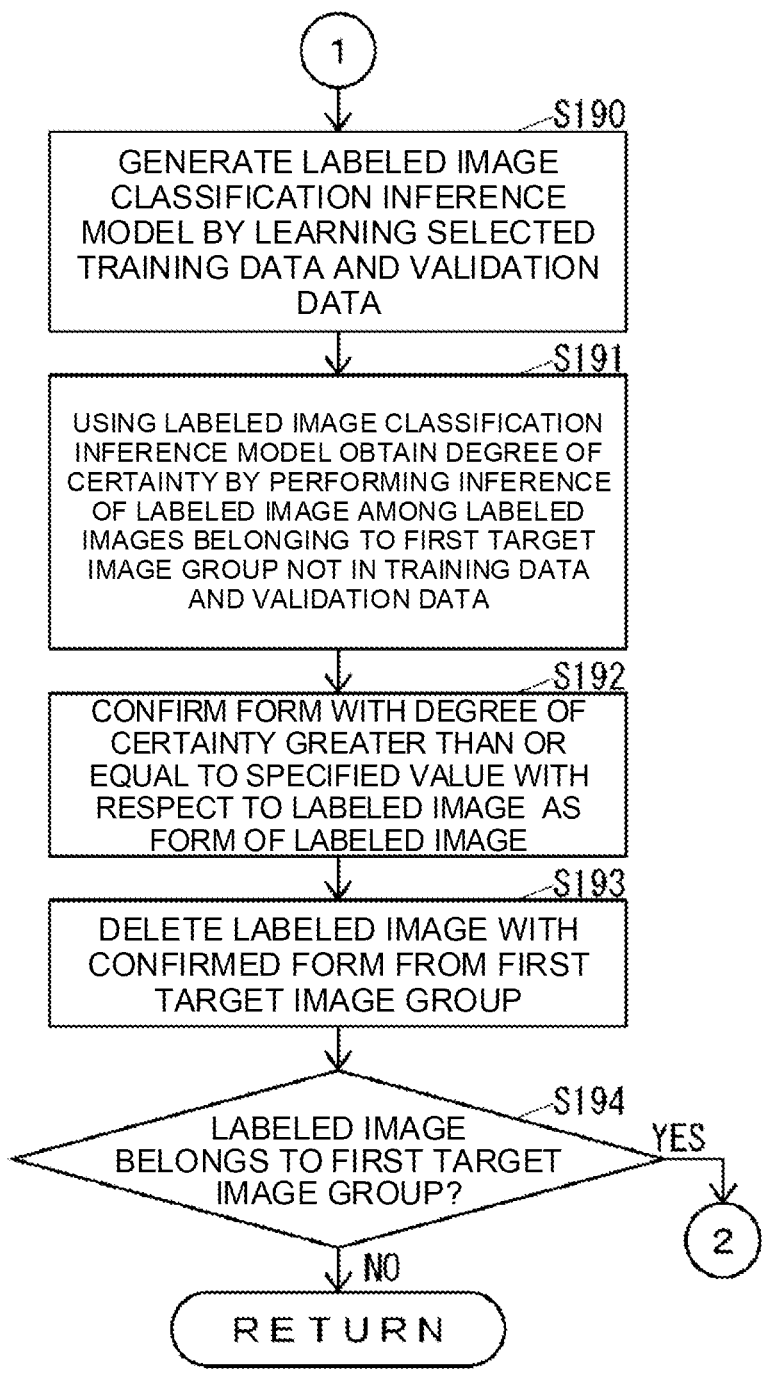
FIG. 11 is a continuation of the flowchart shown in FIG. 10.

FIG. 10 is a flowchart showing a portion of the form determination processing shown in FIG. 9. FIG. 11 is a continuation of the flowchart shown in FIG. 10.

As shown in FIG. 10 and FIG. 11, the label correction unit 25*c* initializes a first target image group representing a group of labeled images to be subjected to label correction processing (S181). That is to say, the label correction unit 25*c* sets the first target image group to a state where no labeled images belong to the group.

After the processing of S181, the label correction unit 25*c* makes all of the labeled images included in the learning dataset 24*d* belong to the first target image group (S182).

Next, the label correction unit 25*c* divides the labeled images belonging to the first target image group into a plurality of clusters on the basis of a feature amount of each labeled image by coarse clustering with a first threshold (S183). Here, the first threshold is a threshold which is high enough to prevent labeled images of the same form from belonging to different clusters.

After the processing of S183, the label correction unit 25*c* sets, among the clusters generated in the processing of S183, one cluster yet to be targeted as the target (S184).

After the processing of S184, the label correction unit 25*c* determines whether or not the number of labeled images belonging to the current target cluster is greater than or equal to a specified number (S185).

If the label correction unit 25*c* determines in S185 that the number of labeled images belonging to the current target cluster is greater than or equal to the specified number, it divides the labeled images belonging to the current target cluster into a plurality of subclusters on the basis of a feature amount of each labeled image by fine clustering with a second threshold, which is lower than the first threshold (S186). Here, the processing of S186 is executed because, by reducing the number of labeled images subjected to the data selection processing described below, the calculation time of the data selection processing can be reduced. Therefore, the second threshold does not need to be a threshold which is high enough to prevent labeled images of the same form from belonging to different subclusters.

If the label correction unit 25*c* determines in S185 that the number of labeled images belonging to the current target cluster is not greater than or equal to the specified number, it makes all of the labeled images belonging to the current target cluster belong to a single subcluster (S187).

After the processing of S186 or S187, the label correction unit 25*c* executes data selection processing which selects the training data and validation data of the learning dataset of the labeled image classification inference model 24*f* (S188).

Figure 12:
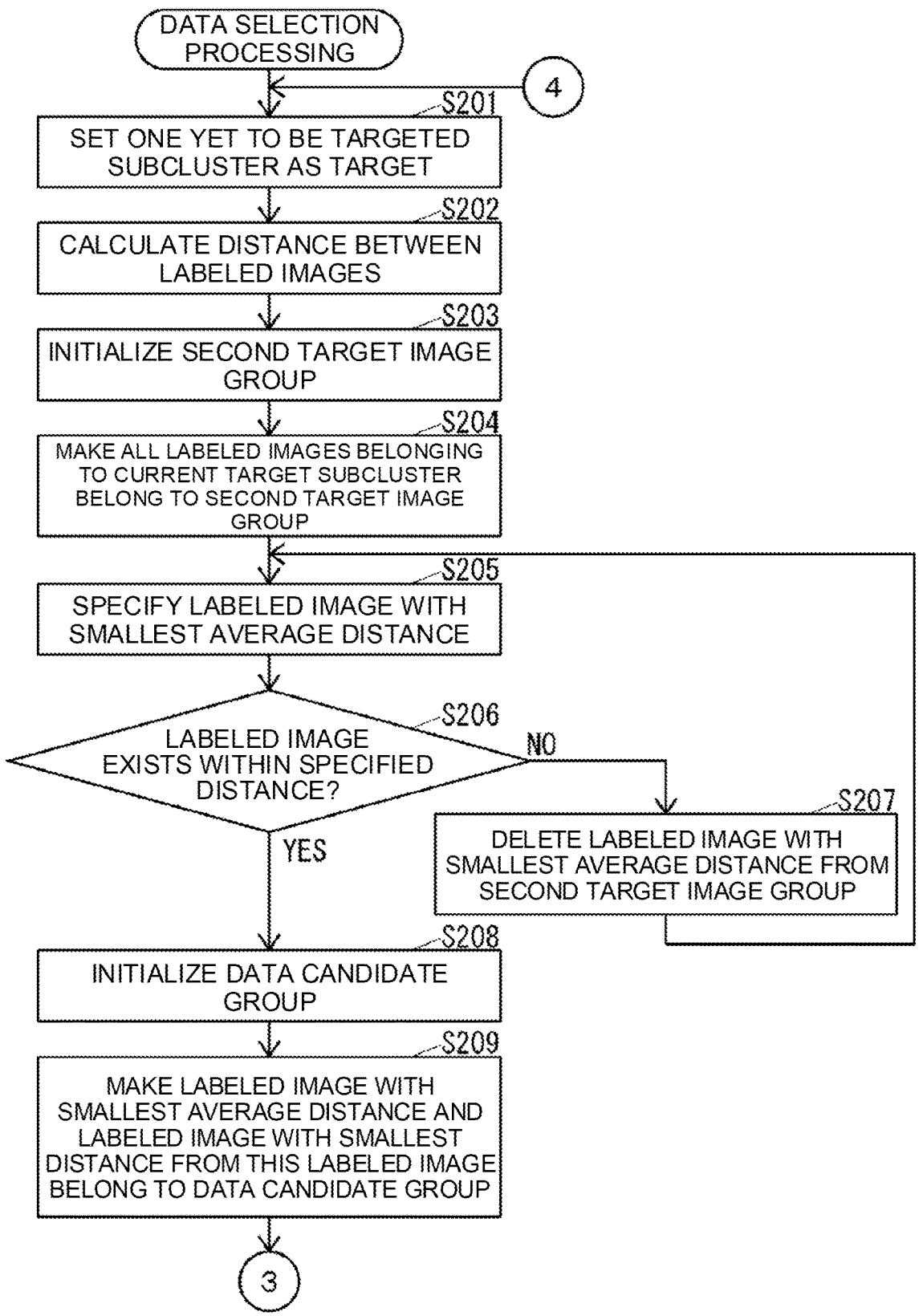
FIG. 12 is a flowchart showing a portion of the data selection processing shown in FIG. 10.
Figure 13:
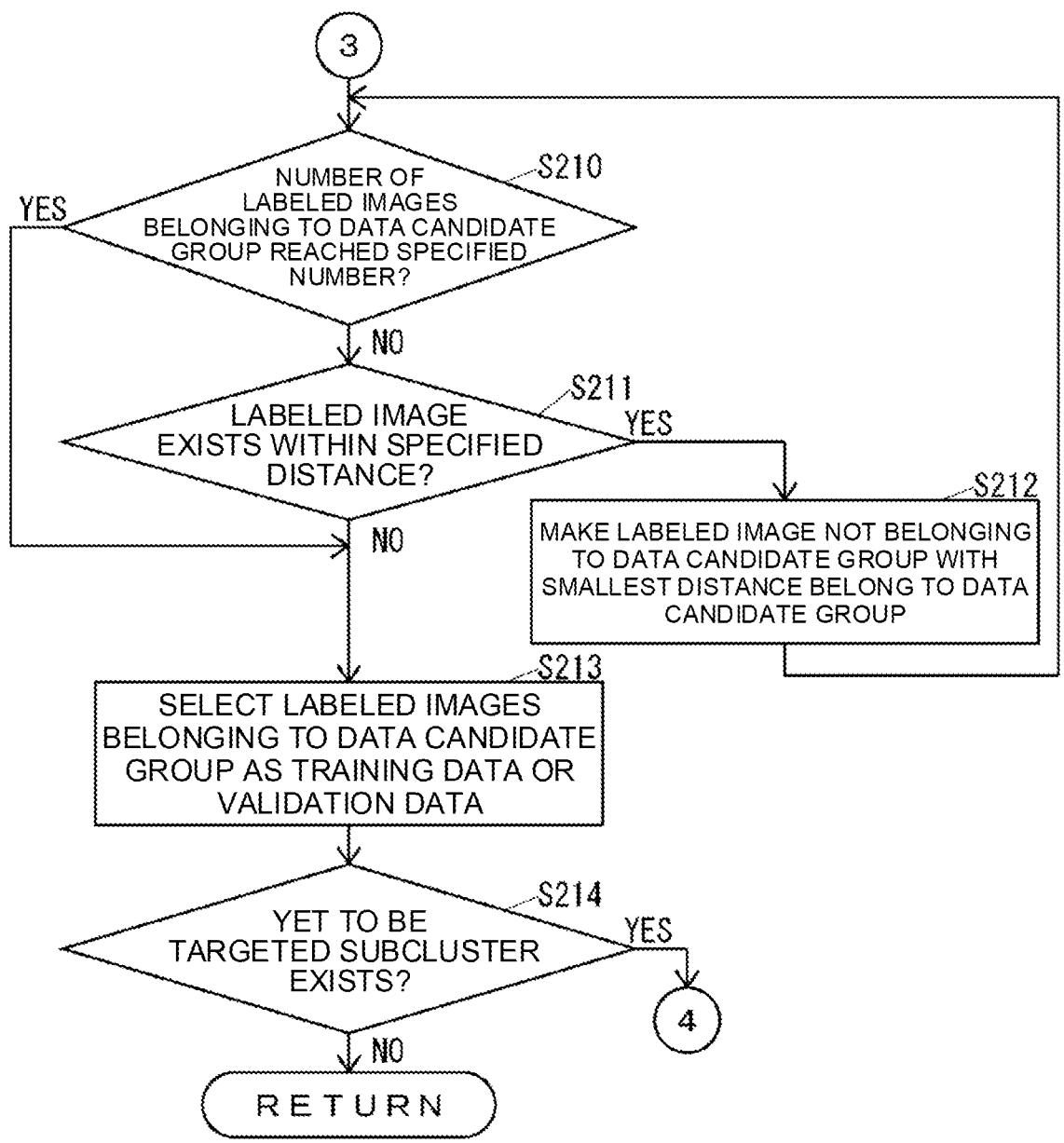
FIG. 13 is a continuation of the flowchart shown in FIG. 12.

FIG. 12 is a flowchart showing a portion of the data selection processing shown in FIG. 10. FIG. 13 is a continuation of the flowchart shown in FIG. 12.

As shown in FIG. 12 and FIG. 13, the label correction unit 25c sets, among the subclusters generated in the processing of S186 and S187, one subcluster which is yet to be targeted as the target (S201).

After the processing of S201, the label correction unit 25c calculates a Euclidean distance as a feature amount (hereinafter, "Euclidean distance as a feature amount" is simply referred to as "distance") between all of the labeled images belonging to the current target subcluster (S202).

Next, the label correction unit 25c initializes a second target image group representing a group of target labeled images of the processing with respect to the current target subcluster (S203). That is to say, the label correction unit 25c sets the second target image group to a state where no labeled images belong to the group.

After the processing of S203, the label correction unit 25c makes all of the labeled images belonging to the current target subcluster belong to the second target image group (S204).

Next, the label correction unit 25c specifies, among the labeled images belonging to the second target image group, the labeled image which has the smallest average distance to the other labeled images belonging to the second target image group calculated in S202 (S205). That is to say, the label correction unit 25c specifies the labeled image having a feature amount which is considered to be near the center of the labeled images belonging to the second target image group.

After the processing of S205, the label correction unit 25c determines whether or not a labeled image exists in the second target image group whose distance from the labeled image specified in S205 is within a specified distance (S206). Here, there is a possibility that the labeled images whose distances from the labeled image specified in S205 are not within the specified distance may have a different form to the labeled image specified in S205.

If the label correction unit 25c determines in S206 that a labeled image does not exist in the second target image group whose distance from the labeled image specified in S205 is within the specified distance, it excludes the labeled image specified in S205 from the second target image group (S207), and executes the processing of S205.

If the label correction unit 25c determines in S206 that a labeled image exists in the second target image group whose distance from the labeled image specified in S205 is within the specified distance, it initializes a data candidate group representing a group of training data and validation data candidates (S208). That is to say, the label correction unit 25c sets the data candidate group to a state where no labeled images belong to the group.

After the processing of S208, the label correction unit 25c makes the labeled image specified in S205, and the labeled image in the second target image group with the smallest distance from the labeled image specified in S205 belong to the data candidate group representing the group of training data and validation data candidates (S209).

After the processing of S209, the label correction unit 25c determines whether or not the number of labeled images belonging to the data candidate group has reached a specified number (S210).

If the label correction unit 25c determines in S210 that the number of labeled images belonging to the data candidate group has not reached the specified number, it determines whether or not a labeled image exists in the second target image group whose distance from the labeled image specified in S205 is within the specified distance, and which is a labeled image not already belonging to the data candidate group (S211).

If the label correction unit 25c determines in S211 that a labeled image exists in the second target image group whose distance from the labeled image specified in S205 is within the specified distance, and which is a labeled image not already belonging to the data candidate group, it makes the labeled image in the second target image group with the smallest distance from the labeled image specified in S205, and which is a labeled image not already belonging to the data candidate group, belong to the data candidate group (S212), and executes the processing of S210.

When the label correction unit 25c determines in S210 that the number of labeled images belonging to the data candidate group has not reached the specified number, or determines in S211 that a labeled image does not exist in the second target image group whose distance from the labeled image specified in S205 is within the specified distance, and which is a labeled image not already belonging to the data candidate group, it selects the labeled images belonging to the data candidate group as training data or validation data (S213). Here, when N is a natural number and the number of labeled images belonging to the data candidate group is 2N, the label correction unit 25c selects the labeled image specified in S205 and the (N−1) labeled images among the labeled images belonging to the data candidate group with the shortest distances from the labeled image specified in S205 as training data, and selects the N labeled images among the labeled images belonging to the data candidate group with the longest distances from the labeled image specified in S205 as validation data. Furthermore, when N is a natural number and the number of labeled images belonging to the data candidate group is (2N+1), the label correction unit 25c selects the labeled image specified in S205 and the N labeled images among the labeled images belonging to the data candidate group with the shortest distances from the labeled image specified in S205 as training data, and selects the N labeled images among the labeled images belonging to the data candidate group with the longest distances from the labeled image specified in S205 as validation data.

The label correction unit 25c determines whether or not a subcluster which is yet to be targeted exists among the subclusters generated in the processing of S186 or S187 (S214).

If the label correction unit 25c determines in S214 that a subcluster which is yet to be targeted exists among the subclusters generated in the processing of S186 or S187, it executes the processing of S201.

If the label correction unit 25c determines in S214 that a subcluster does not exist among the subclusters generated in the processing of S186 or S187 which is yet to be targeted, it ends the data selection processing shown in FIGS. 12 and 13.

As shown in FIG. 10 and FIG. 11, when the label correction unit 25c ends the data selection processing in S188, it determines whether or not a cluster exists among the clusters generated in the processing of S183 which is yet to be targeted (S189).

If the label correction unit 25c determines in S189 that a cluster which is yet to be targeted exists among the clusters generated in the processing of S183, it executes the processing of S184.

If the label correction unit 25c determines in S189 that a cluster which is yet to be targeted does not exist among the clusters generated in the processing of S183, it generates the labeled image classification inference model 24f by learning the training data and validation data of all of the subclusters of all of the clusters (S190). That is to say, the label correction unit 25c generates the labeled image classification inference model 24f from the training data, obtains a degree of certainty by performing inference of the validation data using the generated labeled image classification inference model 24f, and determines that the labeled image classification inference model 24f is appropriate when the degree of certainty is greater than or equal to a specified value.

Next, the label correction unit 25c obtains a degree of certainty by performing inference of a labeled image which is among the labeled images belonging to the first target image group, but not in the training data and the validation data, using the labeled image classification inference model 24f generated in S190 (S191).

After the processing of S191, the label correction unit 25c confirms the form obtained in S191, whose degree of certainty with respect to the labeled image is greater than or equal to the specified value, as the form of the labeled image (S192). The specified value in S192 may, for example, be a value greater than or equal to the lowest degree of certainty, with respect to the target form in the learning in S190, obtained for the validation data of the target form in the learning in S190.

Next, the label correction unit 25c deletes from the first target image group the labeled image whose form was confirmed in S192 (S193).

Then, the label correction unit 25c determines whether or not a labeled image belongs to the first target image group (S194).

If the label correction unit 25c determines in S194 that a labeled image belongs to the first target image group, it executes the processing of S183.

If the label correction unit 25c determines in S194 that a labeled image does not belong to the first target image group, it executes the form determination processing of FIG. 10 and FIG. 11.

In the above, the form determination processing ends when a labeled image does not belong to the first target image group. However, the label correction unit 25c also ends the form determination processing in cases other than when a labeled image does not belong to the first target image group. For example, the label correction unit 25c may end the form determination processing when training data cannot be selected in the data selection processing shown in FIG. 12 and FIG. 13. Further, it may end the form determination processing when validation data cannot be selected in the form determination processing shown in FIG. 12 and FIG. 13. In addition, the label correction unit 25c may end the form determination processing when the number of repetitions of the processing from S183 to S194 reaches a specified frequency. Moreover, the label correction unit 25c may end the form determination processing when the number of labeled images whose form has not been automatically confirmed in the form determination processing reaches a specified number, such as one-tenth of the number at the beginning of execution of the form determination processing.

As shown in FIG. 9, the label correction unit 25c of the document classification server 20 determines, after ending the form determination processing of S161, whether or not a labeled image exists among all of the labeled images included in the learning dataset 24d whose form could not be automatically confirmed in the form determination processing (S162).

If the label correction unit 25c determines in S162 that a labeled image exists whose form could not be automatically confirmed in the form determination processing, it provides the computer 40 with a UI (User Interface) for the user to confirm the form of the labeled image whose form could not be automatically confirmed in the form determination processing (S163). Therefore, the control unit 45 of the computer 40 displays the UI provided from the document classification server 20 in S163 on the display unit 42, and is capable of receiving operations made with respect to the UI via the operation unit 41. The UI provided in S163 includes not only the labeled image whose form could not be automatically confirmed in the form determination processing, but also the identification information of the form that was automatically confirmed in the form determination processing, and the labeled images belonging to the form. Therefore, the dataset creator can confirm the form of the labeled image whose form could not be automatically confirmed in the form determination processing by referring to the identification information of the form that was automatically confirmed in the form determination processing, and the labeled images belonging to the form.

The label correction unit 25c may automatically set the identification information of the form that was automatically confirmed in the form determination processing. For example, the label correction unit 25c may extract by OCR (Optical Character Recognition) the text of each of the plurality of labeled images belonging to the form that was automatically confirmed in the form determination processing, extract the character string which is common to the text extracted from each of the plurality of labeled images, and automatically set the identification information of the form on the basis of the extracted character string.

After the processing of S163, the label correction unit 25c continues to determine whether or not the forms of all of the labeled images whose form could not be automatically confirmed in the form determination processing have been confirmed via the UI until it determines that the forms of all of the labeled images whose form could not be automatically confirmed in the form determination processing have been confirmed via the UI (S164).

When the label correction unit 25c determines in S162 that a labeled image whose form could not be automatically confirmed in the form determination does not exist, or determines in S164 that the forms of all of the labeled images whose form could not be automatically confirmed in the form determination processing have been confirmed via the UI, it determines whether or not a plurality of labeled images exist with the same form as automatically confirmed in the form determination processing or confirmed via the UI, but with different labels to each other (S165).

If the label correction unit 25c determines in S165 that a plurality of labeled images exist with the same form but different labels to each other, it provides the computer 40 with a UI for the user to correct the labels of the plurality of labeled images with the same form but different labels to each other (S166). Therefore, the control unit 45 of the computer 40 displays the UI provided from the document classification server 20 in S166 on the display unit 42, and is capable of receiving operations made with respect to the UI via the operation unit 41. The UI provided in S166 not only includes the plurality of labeled images with the same form but different labels to each other, but also their labels. Therefore, the dataset creator is capable of changing the labels of the plurality of labeled images with the same form but different labels to each other by referring to the current labels of the plurality of labeled images with the same form but different labels to each other. The UI provided in S166 may also contain information indicating which label is the most common among the labeled images with the same form.

After the processing of S166, the label correction unit 25c continues to determine whether or not an instruction has been issued via the UI to correct the labels of the plurality of labeled images with the same form but different labels to each other until it determines that an instruction has been issued via the UI to correct the labels of the plurality of labeled images with the same form but different labels to each other (S167).

If the label correction unit 25c determines in S167 that instruction has been issued via the UI to correct the labels of the plurality of labeled images with the same form but different labels to each other, it corrects the labels according to the instruction (S168), and ends the operation shown in FIG. 9.

As described above, the document classification system 10: divides a plurality of labeled images into a plurality of clusters by performing clustering on the basis of a feature amount of the labeled images (S183); selects training data for each of the clusters from among the labeled images belonging to the cluster (S213); generates, by learning the training data of all of the clusters, the labeled image classification inference model 24f that serves as an inference model for classifying labeled images by form (S190); obtains a degree of certainty by performing inference of a labeled image using the labeled image classification inference model 24f (S191); confirms a form in which the degree of certainty with respect to the labeled image is greater than or equal to a specified value as the form of the labeled image (S192); and provides a UI that causes the labeled images having the same form as each other to be assigned the same label (S166). Therefore, the probability that the labels assigned to the labeled images included in the learning dataset 24d are appropriate can be improved. As a result, the accuracy of the document classification inference model 24b can be improved.

The document classification system 10 provides a UI that causes the labels of a plurality of labeled images with the same form but different labels to each other to be corrected (S166). Therefore, the burden of the correction operation that assigns appropriate labels to the labeled images included in the learning dataset 24d can be reduced. As a result, the burden of the operation that corrects the learning dataset 24d can be reduced.

In the present embodiment, the label correction unit 25c provides the computer 40 with a UI for the user to correct the labels of a plurality of labeled images with the same form but different labels to each other (S166). However, the label correction unit 25c may automatically correct the labels of the plurality of labeled images with the same form but different labels to each other. For example, the label correction unit 25c may set the labels of the plurality of labeled images with the same form but different labels to each other so as to match the most common label among the plurality of labeled images of that form.

Second Embodiment

First, the configuration of a document classification system serving as a learning dataset generation system according to a second embodiment of the present disclosure will be described.

The description of configurations of the document classification system according to the present embodiment that are the same as the configurations of the document classification system 10 according to the first embodiment (see FIG. 1) will be omitted.

Figure 14:
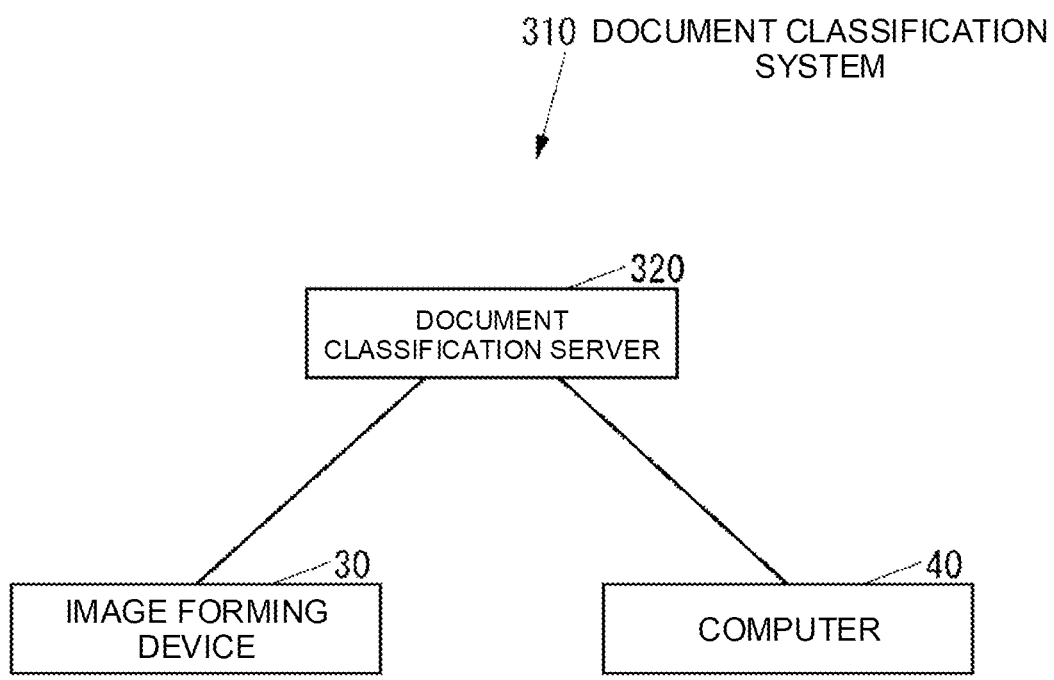
FIG. 14 is a block diagram of a document classification system according to a second embodiment of the present disclosure.

FIG. 14 is a block diagram of a document classification system 310 according to the present embodiment.

As shown in FIG. 14, the configuration of the document classification system 310 is the same as the configuration of the document classification system 10 according to the first embodiment (see FIG. 1) when the document classification server 20 (see FIG. 1) is replaced with the document classification server 320.

Figure 15:
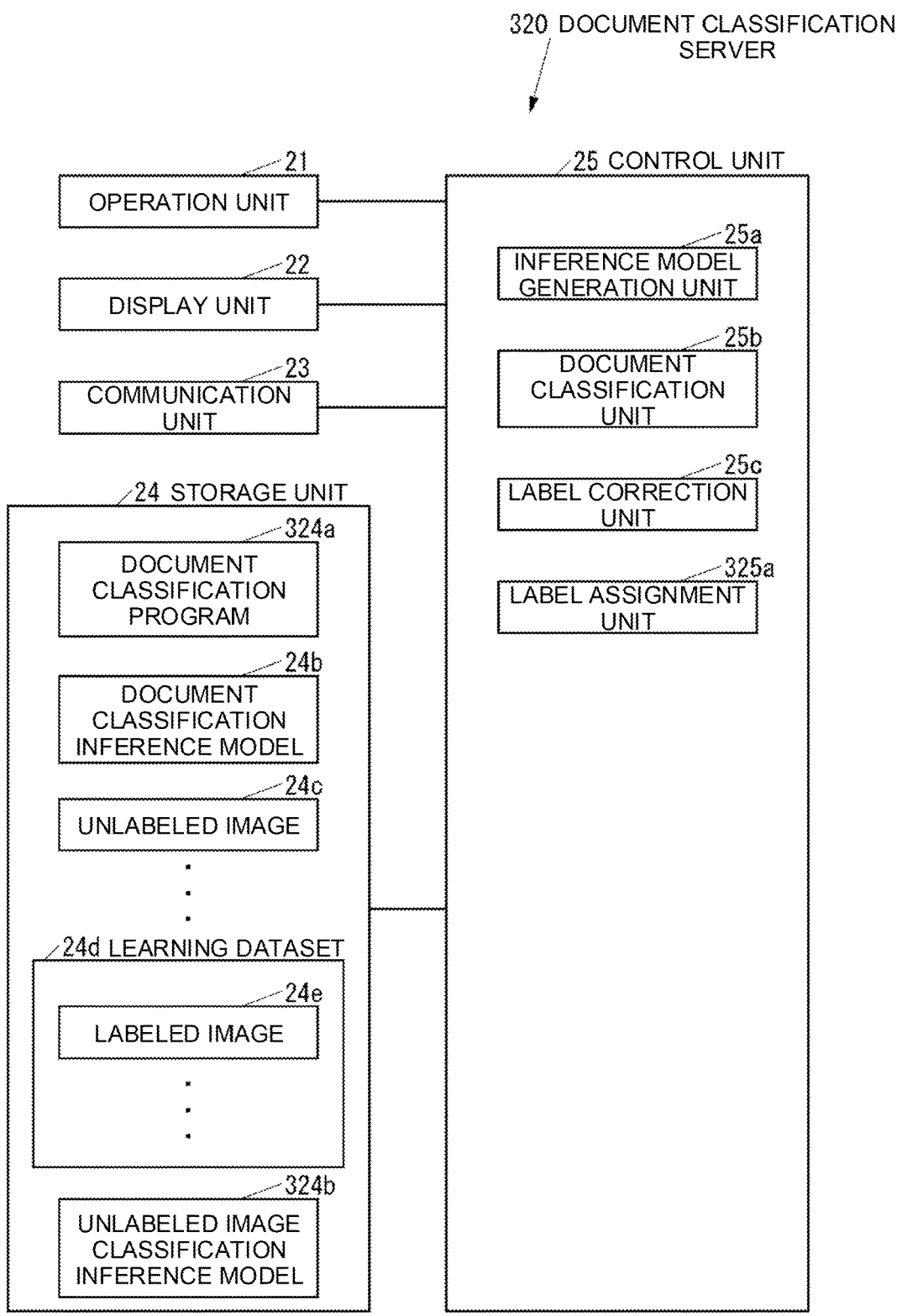
FIG. 15 is a block diagram of the document classification server shown in FIG. 14.

FIG. 15 is a block diagram of the document classification server 320.

As shown in FIG. 15, the configuration of the document classification server 320 is the same as the configuration of the document classification server 20 (see FIG. 2) when the document classification program 324a for classifying a document, and the unlabeled image classification inference model 324b which serves as an image classification inference model, which is an inference model for classifying an unlabeled image by form, are provided instead of the document classification program 24a (see FIG. 2) and the labeled image classification inference model 24f (see FIG. 2).

As a result of executing the document classification program 324a, the control unit 25 realizes the inference model generation unit 25a, the document classification unit 25b, and the label assignment unit 325a, which assigns a label to an unlabeled image. The label assignment unit 325a generates the learning dataset 24d. Therefore, the document classification program 324a constitutes the learning dataset generation program of the present disclosure. Furthermore, the document classification server 320 constitutes the learning dataset generation server of the present disclosure.

Next, the operation performed the document classification system 310 will be described.

Except for the content described below, the operation performed by the document classification system 310 is the same as the operation performed by the document classification system 10.

The operation performed by the document classification system 310 when processing that assigns a label to an unlabeled image (hereinafter referred to as "label assignment processing") is executed will be described.

Figure 16:
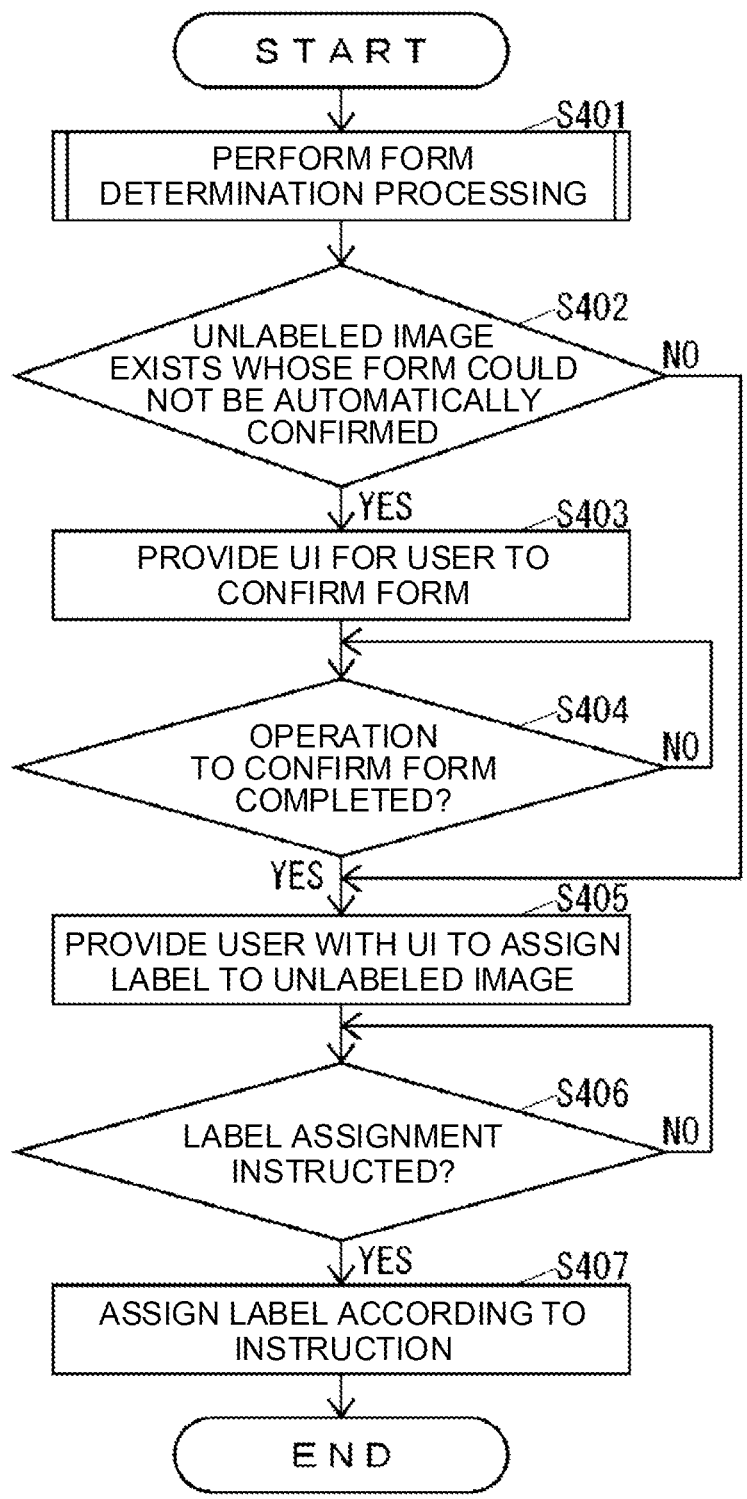
FIG. 16 is a flowchart performed by the document classification server shown in FIG. 15 when label assignment processing is executed.

When the label assignment unit 325a of the document classification server 320 receives the request in S104 (see FIG. 5), it executes the label assignment processing shown in FIG. 16.

FIG. 16 is a flowchart performed by the document classification server 320 when label assignment processing is executed.

As shown in FIG. 16, the label assignment unit 325a of the document classification server 320 executes the same form determination processing as the form determination processing (see FIG. 9) in S161 (S401). The form determination processing in S161 is processing which is executed with respect to labeled images. However, the form determination processing in S401 is executed with respect to unlabeled images.

After ending the form determination processing in S401, the label assignment unit 325a determines whether or not an unlabeled image exists among all of the unlabeled image accumulated in the storage unit 24 whose form could not be automatically confirmed in the form determination processing (S402).

If the label assignment unit 325a determines in S402 that an unlabeled image exists whose form could not be automatically confirmed in the form determination processing, in the same manner as the processing of S163, it provides the computer 40 with a UI for the user to confirm the form of the unlabeled image whose form could not be automatically confirmed in the form determination processing (S403). The dataset creator is capable of completing the operation of confirming the form of a unlabeled image even when an unlabeled image exists whose form is yet to be confirmed.

After the processing of S403, the label assignment unit 325a continues to determine whether or not the operation of confirming the form of the unlabeled image is completed until it determines that the operation of confirming the form of the unlabeled image is completed (S404).

When the label assignment unit 325a determines in S402 that an unlabeled image whose form could not be automatically confirmed in the form determination processing does not exist, or determines in S404 that the operation of confirming the form of the unlabeled image has been completed, it provides the computer 40 with a UI for the user to assign a label to the unlabeled image (S405). Therefore, the control unit 45 of the computer 40 displays the UI provided from the document classification server 320 in S405 on the display unit 42, and is capable of receiving operations made with respect to the UI via the operation unit 41. In the UI provided in S405, it is possible to simultaneously assign the same label to a plurality of unlabeled images with the same form. Further, it is possible to assign labels one at a time to unlabeled images whose form is yet to be confirmed. If a plurality of unlabeled images with the same form exist, although the UI provided in S405 includes the plurality of unlabeled images with the same form, these unlabeled images may be thumbnails. If unlabeled images exist whose form is yet to be confirmed, the UI provided in S405 includes the unlabeled images whose form is yet to be confirmed. The processing of S405 corresponds to the processing of S105 (see FIG. 5).

After the processing of S405, the label assignment unit 325a continues to determine whether or not an instruction has been issued to assign a label to the unlabeled image via the UI until it determines that an instruction has been issued to assign a label to the unlabeled image via the UI (S406).

If the label assignment unit 325a determines in S406 that an instruction has been issued to assign a label to the unlabeled image via the UI, it assigns a label according to the instruction (S407), and ends the operation shown in FIG. 16.

As described above, the document classification system 310: divides a plurality of unlabeled images into a plurality of clusters by performing clustering on the basis of a feature amount of the unlabeled images; selects training data for each of the clusters from among the unlabeled images belonging to the cluster; generates, by learning the training data of all of the clusters, the unlabeled image classification inference model 324b that serves as an inference model for classifying the unlabeled images by form; obtains a degree of certainty by performing inference of an unlabeled image using the unlabeled image classification inference model 324b; confirms a form in which the degree of certainty with respect to the unlabeled image is greater than or equal to a specified value as the form of the labeled image (S401); and provides a UI that causes the unlabeled images having the same form as each other to be assigned the same label (S405). Therefore, the probability that the labels assigned to the labeled images included in the learning dataset 24d are appropriate can be improved. As a result, the accuracy of the document classification inference model 24b can be improved.

The document classification system 310 provides a UI that causes a plurality of unlabeled images with the same form to be simultaneously assigned the same label (S405). Therefore, the burden of the operation that assigns appropriate labels to document images can be reduced. As a result, the burden of the operation that generates the learning dataset 24d can be reduced.

The control unit 25 of the document classification server 320 does not have to execute the label correction processing shown in FIG. 9.

What is claimed is:

1. A learning dataset generation system that generates a learning dataset of a document classification inference model that serves as an inference model for classifying a document image, which is an image of a document, by a form thereof and assigning a label to the document image classified, wherein
    the learning dataset includes a plurality of labeled document images each of which is the document image that has been assigned the label on the basis of the form,
    the learning dataset generation system divides the plurality of labeled document images into a plurality of clusters by performing clustering on the basis of a feature amount of the labeled document images, selects training data for each of the clusters from among the labeled document images belonging to the cluster, and generates, by learning the training data of all of the clusters, a labeled image classification inference model that serves as an inference model for classifying the labeled document images by the form,
    the learning dataset generation system performs inference of the labeled document image using the labeled image classification inference model to obtain a degree of certainty with respect to the labeled document image, and confirms the form of the labeled document image in accordance with the degree of certainty with respect to the labeled document image being greater than or equal to a specified value, and
    the learning dataset generation system provides a UI that causes the labeled document images having the same form as each other in accordance with a result of confirming the form based on the degree of certainty, to be assigned the same label.

2. The learning dataset generation system according to claim 1, wherein
    the UI corrects the labels of a plurality of labeled document images that have the same form but different labels to each other.

3. The learning dataset generation system according to claim 1, wherein
    the UI causes a plurality of labeled document images that have the same form to be collectively assigned the same label.

4. A learning dataset generation server that generates a learning dataset of a document classification inference model that serves as an inference model for classifying a document image, which is an image of a document, by a form thereof and assigning a label to a document image, which is an image of a document, wherein
    the learning dataset includes a plurality of labeled document images that have been assigned the label on the basis of the form,
    the learning dataset generation server divides the plurality of labeled document images into a plurality of clusters by performing clustering on the basis of a feature amount of the labeled document images, selects training data for each of the clusters from among the labeled document images belonging to the cluster, and generates, by learning the training data of all of the clusters, a labeled image classification inference model that serves as an inference model for classifying labeled document images by the form, the learning dataset generation server performs inference of the labeled document image using the labeled image classification inference model to obtain a degree of certainty with respect to the labeled document image, and confirms the form of the labeled document image in accordance with the degree of certainty with respect to the labeled document image being greater than or equal to a specified value, and the learning dataset generation server provides a UI that causes the labeled document images having the same form as each other in accordance with a result of confirming the form based on the degree of certainty, to be assigned the same label.

5. A non-transitory computer-readable recording medium that stores a learning dataset generation program for generating a learning dataset of a document classification inference model that serves as an inference model for classifying a document image, which is an image of a document, by a form thereof and assigning a label to a document image, which is an image of a document, wherein the learning dataset includes a plurality of labeled document images that have been assigned the label on the basis of the form, a computer, as a result of executing the learning dataset generation program, divides the plurality of labeled document images into a plurality of clusters by performing clustering on the basis of a feature amount of the labeled document images, selects training data for each of the clusters from among the labeled document images belonging to the cluster, and generates, by learning the training data of all of the clusters, a labeled image classification inference model that serves as an inference model for classifying the labeled document images by the form, the computer, as a result of executing the learning dataset generation program, performs inference of the labeled document image using the labeled image classification inference model to obtain a degree of certainty with respect to the labeled document image, and confirms the form of the labeled document image in accordance with the degree of certainty with respect to the labeled document image being greater than or equal to a specified value, and the computer, as a result of executing the learning dataset generation program, provides a UI that causes the labeled document images having the same form as each other in accordance with a result of confirming the form based on the degree of certainty, to be assigned the same label.

* * * * *